US012381785B2

(12) United States Patent
Moaleji et al.

(10) Patent No.: US 12,381,785 B2
(45) Date of Patent: *Aug. 5, 2025

(54) ENHANCED PRE-LOADING FOR EDGE GATEWAYS IN COMMUNICATIONS NETWORKS

(71) Applicant: CenturyLink Intellectual Property LLC, Denver, CO (US)

(72) Inventors: Austin Moaleji, Irvine, CA (US); Pavan Rampalli, Centennial, CO (US)

(73) Assignee: CenturyLink Intellectual Property LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/742,475

(22) Filed: Jun. 13, 2024

(65) Prior Publication Data

US 2024/0333596 A1    Oct. 3, 2024

Related U.S. Application Data

(63) Continuation of application No. 18/361,723, filed on Jul. 28, 2023, now Pat. No. 12,015,525.

(Continued)

(51) Int. Cl.
*H04L 41/0895* (2022.01)
*G06F 9/455* (2018.01)
(Continued)

(52) U.S. Cl.
CPC ...... *H04L 41/0895* (2022.05); *G06F 9/45558* (2013.01); *H04L 41/0806* (2013.01);
(Continued)

(58) Field of Classification Search
CPC ............ H04L 41/0895; H04L 41/0806; H04L 41/0846; G06F 9/45558;
(Continued)

(56) References Cited

U.S. PATENT DOCUMENTS 11,621,917 B2    4/2023  Lynch
2012/0265959 A1  10/2012 Le
(Continued)

FOREIGN PATENT DOCUMENTS

WO   WO-2011075484        6/2011
WO   WO-2011075484 A2  *  6/2011  ............. G06F 21/57

OTHER PUBLICATIONS

International Search Report and Written Opinion of the International Searching Authority, dated Nov. 10, 2023, Int'l Appl. No. PCT/US2023/029030, Int'l Filing Date Jul. 28, 2023; 11 pgs.

(Continued)

*Primary Examiner* — Philip C Lee

(57) ABSTRACT

This disclosure describes systems, methods, and devices related to staging a universal customer edge gateway device. A universal customer edge gateway device may generate, prior to deployment of the universal customer edge gateway device at a customer location, copies of virtual network function (VNF) operating system (OS) images on the universal customer edge gateway device, the copies including a first copy of a first VNF OS image and a second copy of a second VNF OS image; identify, during a deployment of the universal customer edge gateway device at the customer location, a selection of the first copy from a list of the copies;

(Continued)

copy, during the deployment and based on the selection, the first VNF OS image to the universal customer edge gateway device; and instantiate, at the universal customer edge gateway device, the copied first VNF OS image.

10 Claims, 4 Drawing Sheets

Related U.S. Application Data

(60) Provisional application No. 63/370,144, filed on Aug. 2, 2022.

(51) Int. Cl.
*H04L 41/0806* (2022.01)
*H04L 41/084* (2022.01)

(52) U.S. Cl.
CPC .............. *H04L 41/0846* (2013.01); *G06F 2009/45562* (2013.01); *G06F 2009/45595* (2013.01)

(58) Field of Classification Search
CPC . G06F 2009/45562; G06F 2009/45595; G06F 9/44505; G06F 9/44536; G06F 8/63
See application file for complete search history.

(56) References Cited

U.S. PATENT DOCUMENTS

| | | | |
|---|---|---|---|
| 2013/0167140 A1 | 6/2013 | Androncik | |
| 2016/0094664 A1* | 3/2016 | Olcese | G06F 8/31 709/225 |
| 2017/0010908 A1* | 1/2017 | Matzek | G06F 3/0619 |
| 2017/0337070 A1* | 11/2017 | Lee | H04L 67/1095 |
| 2019/0079788 A1 | 3/2019 | Ruty | |
| 2020/0097274 A1* | 3/2020 | Sarkar | G06F 8/63 |
| 2021/0303469 A1* | 9/2021 | Lu | G06F 9/5016 |
| 2021/0336845 A1* | 10/2021 | Kumble Seetharama | G06F 9/4406 |
| 2022/0326941 A1* | 10/2022 | Nelson | A61P 35/00 |
| 2024/0048450 A1 | 2/2024 | Moaleji | |

OTHER PUBLICATIONS

Huedo, Eduardo et al., "Opportunistic Deployment of Distributed Edge Clouds for Latency-Critical Applications", *J. Grid Computing* vol. 19, No. 1 Mar. 1, 2021, pp. 1-16.
International Preliminary Report on Patentability, dated Feb. 13, 2025, Int'l Appl. No. PCT/US2023/029030, Int'l Filing Date Jul. 28, 2023; 8 pgs.

* cited by examiner

大,381,785 B2

ENHANCED PRE-LOADING FOR EDGE GATEWAYS IN COMMUNICATIONS NETWORKS

TECHNICAL FIELD

Embodiments of the present invention generally relate to systems and methods for configuring edge gateway devices for communications networks.

BACKGROUND

When a customer premises device is provisioned at a customer location, the provisioning may include downloading software and configurations for the device, often from a centralized server using a file transfer protocol. The downloads and configuration may require a significant amount of time, and there may be some risk of data corruption during the download.

SUMMARY

An universal edge gateway device for a communications network may be sent to a customer location for use. To avoid long and possibly unreliable downloading during instantiation of the customer edge gateway device, the customer edge gateway device may access a locally stored cloud (e.g., a cloud at the customer location) to access software, settings and configuration, and the like.

Virtual network functions (VNFs) may be stored locally at the local cloud to pre-cache operating systems accessible to the universal customer edge gateway device. During the installation of the customer edge gateway device, a process may copy the VNF's operating system (OS) into storage of the customer edge gateway device. The process may store the VNF's OS in a separate and secured partition in the customer edge gateway device. The VNFs themselves may not be deployed/instantiated.

When a customer requests to deploy/instantiate a VNF from a supported list, the OS of the VNF (e.g., a Golden Image) may be copied internally from a cache partition to hypervisor instead of downloading from backend systems over the internet as some other customer edge gateway devices may do. Pre-caching of VNF OSs may save significant installation time for a customer edge gateway device (e.g., over an hour when compared to downloads of multiple gigabytes). The enhanced process described herein is different than existing pre-caching processes in that it does not install the software for the customer edge gateway devices, but instead stores the software in the customer edge gateway devices to be installed as needed/requested. As a result, the hardware resources of the customer edge gateway devices may be saved by preventing the installation of unused software, and the bandwidth needed for a large download may be avoided. For an example comparison, a customer device such as a laptop may have an OS pre-installed, and then may use a key to authenticate and update the OS to the latest version. In the present disclosure, the OS is not pre-installed on the universal device, but rather a usable image—not usable until the device finds and instantiates it—is stored on the device for possible instantiation.

The universal customer edge gateway devices may be embedded with VNFs/QCOW2s prior to being shipped to a customer location for use. The customer edge gateway devices may, when activated at the customer location, find and select an image of a VNF/QCOW2 from the locally stored options (e.g., in a directory), and instantiate any selected VNF/QCOW2.

Figure 1:
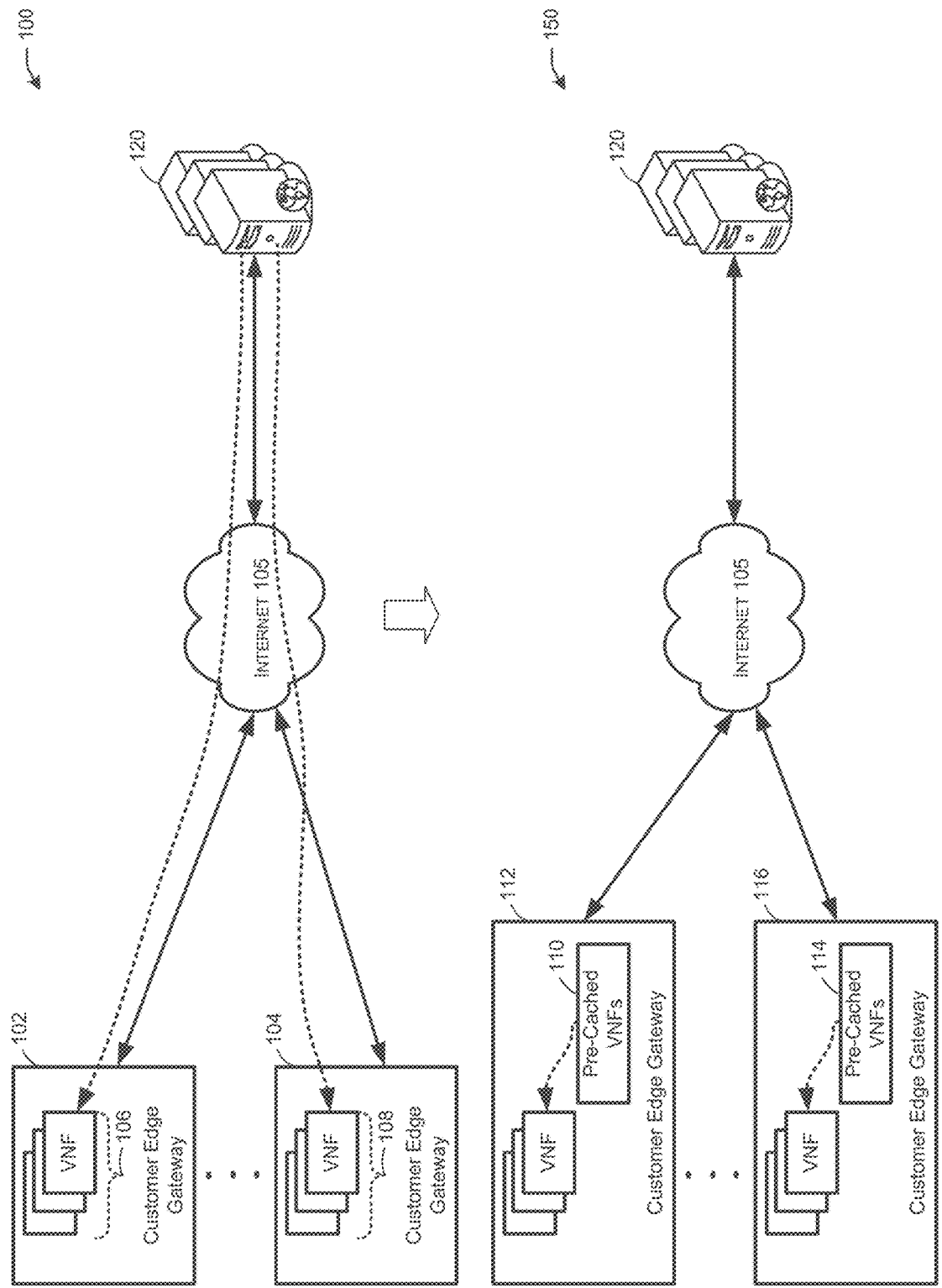
FIG. 1 illustrates exemplary network environments for staging universal customer edge gateway devices in accordance with one embodiment.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Aspects of the present disclosure involve systems, methods, and the like, for configuring universal customer edge gateway devices for communications networks.

A universal customer edge gateway device may need to be able to instantiate one or more VNFs from among many available VNFs. Rather than pre-installing a VNF for an OS, a customer edge gateway device may be shipped to a customer location where it may select from available VNFs. When staging a universal customer edge gateway device (e.g., a universal customer premises equipment-UCPE), the universal customer edge gateway device may download VNFs from backend systems. The downloading may be time-intensive, requiring over an hour for downloads of multiple gigabytes. For example, downloading a Windows Operating System may require over ten gigabytes of data to download. Not only is a large VNF download time-intensive, but such large downloads may be vulnerable to data corruption.

There is therefore a need for enhanced staging of universal customer edge gateway devices for communications networks.

In one or more embodiments, the VNFs/QCOW2s may be pre-cached at a universal customer edge gateway device. When the universal customer edge gateway device is shipped to a customer location and activated at the customer location, the universal customer edge gateway device may select from the pre-cached VNFs/QCOW2s. In this manner, the universal customer edge gateway device may select from a pre-loaded set of VNF/QCOW2 images to instantiate at the universal customer edge gateway device, avoiding the need to download the images from a remote location.

In one or more embodiments, the OS of any VNF may be copied into the local storage of the universal customer edge gateway device. The storage of the VNF OSs may use a separate and secure partition in the universal customer edge gateway device, and the VNFs themselves may not be deployed/instantiated.

In one or more embodiments, when a customer requests to deploy/instantiate a VNF from a supported list, the OS of the VNF may be copied internally from a cache partition to a hypervisor rather than downloading from backend systems over the internet.

In one or more embodiments, the universal customer edge gateway device may use application programming interfaces (APIs) to retrieve and delete cached VNF images. The VNF cache partition may be protected with a root privilege, so the API request for the list of VNFs may require a security token. The returned list of available VNFs may include the QCOW2 files representing the images of the available VNFs for instantiation.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 illustrates exemplary network environments for staging universal customer edge gateway devices in accordance with one embodiment.

Referring to FIG. 1, network environment 100 includes universal customer edge gateway devices (e.g., customer edge gateway 102, . . . , customer edge gateway 104, etc.) connected to edge gateway backend systems 120. The edge gateway backend systems 120 may include a VNF repository from which the universal customer edge gateway devices may download VNF OSs via the Internet 105. For example, the customer edge gateway devices may have one or more VNFs (e.g., VNFs 106 on the customer edge gateway 102, VNFs 108 on the customer edge gateway 104) whose VNF OSs may be downloaded to the customer edge gateway devices.

Still referring to FIG. 1, network environment 150 improves upon the network environment 100 by pre-caching VNFs on universal customer edge gateway devices (e.g., pre-cached VNFs 110 on a customer edge gateway 112, . . . , pre-cached VNFs 114 on a customer edge gateway 116). Because the VNFs may be pre-cached, the universal customer edge gateway devices may avoid having to download VNF OSs via the Internet 105 as in the network environment 100.

In one or more embodiments, during a VNF OS image installation, the VNF OSs may be copied into a separate, partitioned storage of the universal customer edge gateway devices of the network environment 150 so that the VNFs themselves are not deployed/instantiated. When a customer (e.g., user) of the universal customer edge gateway devices requests to deploy/instantiate a VNF from a supported list of the pre-cached VNFs stored on the universal customer edge gateway devices, the OS of a selected VNF may be copied internally from the cache partition to a hypervisor (e.g., the hypervisor 411 of FIG. 4). In this manner, the OSs of the VNFs may not be installed on the universal customer edge gateway devices, but rather the VNFs may be stored as software on the universal customer edge gateway devices to instantiate software of one or more supported VMFs (e.g., from among multiple VMFs supported by a customer edge gateway device).

Figure 2:
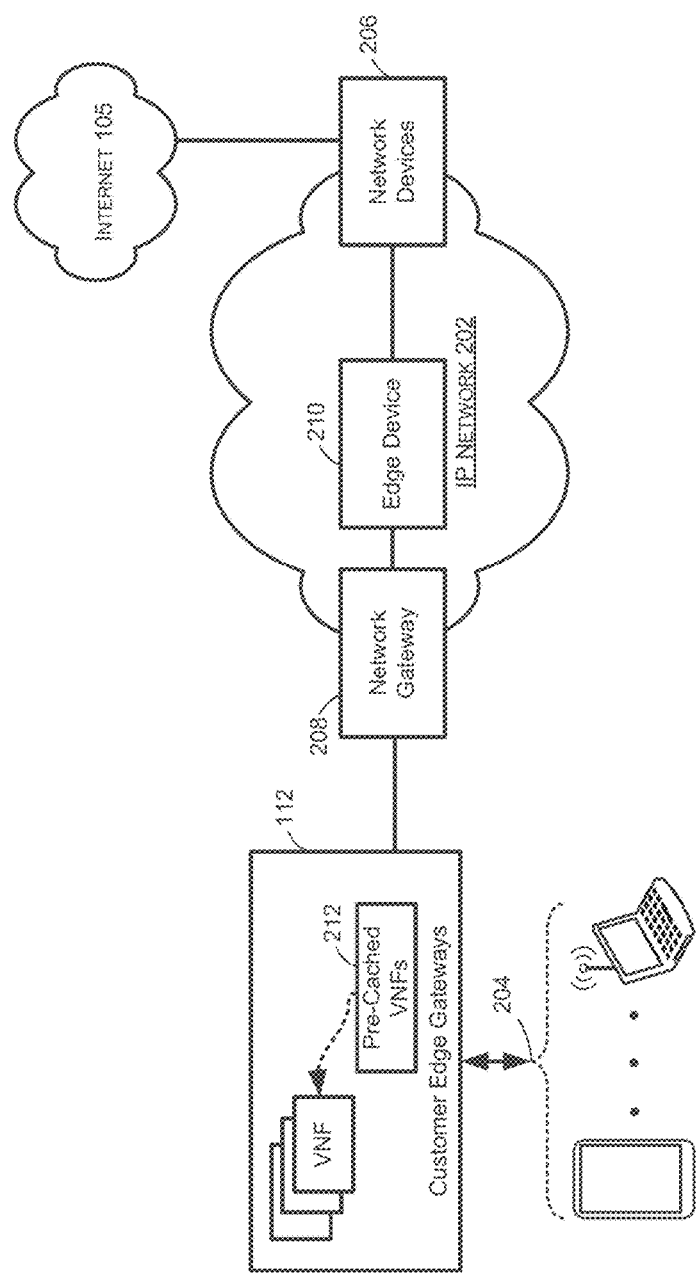
FIG. 2 is a schematic diagram illustrating a network operating environment with universal customer edge gateway devices in accordance with one embodiment.

FIG. 2 is a schematic diagram illustrating a network operating environment 200 with universal customer edge gateway devices in accordance with one embodiment.

Referring to FIG. 2, the exemplary operating environment 200 may provide Internet services for in one or more networks, including customer devices, is shown. In general, the environment 200 provides for establishing communication sessions between network users and for providing one or more network services to network users via the communication sessions. For example, users may utilize an IP network to communicate or otherwise interact with the broader Internet 105 via the network using communication devices 204, such as mobile communication devices and/or other computing devices. In some instances, content from the Internet 105 (such as multimedia content accessible via a content delivery network (CDN)) may be provided to and/or from one or more customers of the IP network 202 through the operating environment 200. With specific reference to FIG. 2, the IP network 202 may be provided by a wholesale network service provider and which may include various interconnected network devices 206 for transmission of data packets between the devices. In some instances, the IP network 202 may be referred to as a "backbone" network that is configured to carry data packets or communications over long distances. While the environment 200 of FIG. 2 shows a configuration using the IP network 202, it should be appreciated that portions of the network may include non IP-based routing.

The IP network 202 includes numerous components such as, but not limited to gateways 208, routers, route reflectors, and registrars, which enable communication and/or provides services across the IP network 202, some of which are not shown or described in detail here because those skilled in the art will readily understand these components. Communications between the IP network 202 and other entities or networks, such as one or more customer home or business local area networks (LANs), connected to the IP network 202, may also be managed through network environment 200. Connected networks may include communication devices such as, but not limited to, a personal computer or mobile computing device (e.g., the communication devices 204) connected to a residential gateway (e.g., customer edge gateway devices 205) that provides an interface for the communication devices of the connected networks of communications devices. The communication and networking components of the connected networks enable a user at the customer network to communicate with the IP network 202 to receive services from the IP network 202, such as access to the Internet 105 among other network services.

Components of the connected networks of communications devices are typically home- or business-based, but they can be relocated and may be designed for easy portability. For example, the communication devices 204 may be wireless (e.g., cellular) telephone, smart phone, tablet or portable laptop computer. In some embodiments, multiple connected networks are owned or operated by a particular or multiple entities that may be connected to the IP network 202 from the same or similar location. Each network may be operated by a separate entity or customer to the IP network, although each connected network may access the IP network 202 via a same gateway device. The IP network 202 may provide access to networks, such as Internet 105 access.

Each connected network may include a corresponding customer edge gateway (e.g., of the customer edge gateways 205) to connect to the IP network 202 through one or more interface devices. Further, the IP network 202 may connect to other networks, such as the Internet 105, via other network edge devices, such as gateways or provider edges (e.g., edge devices 210). For case of instruction, only the Internet 105 is shown connecting to the IP network 202;

however, numerous such networks, and other devices, may be connected with the IP network 202, which is equipped to handle enormous numbers of simultaneous calls and/or other IP-based communications.

The IP network 202 may include any number and type of network devices to provide services and transmit communication packets. In one implementation, a network gateway (e.g., of the network gateways 208, such as a broadband network gateway (BNG) may be connected to an edge device (e.g., of the edge devices 210) to receive and provide communications and other data to the connected networks. The edge device may, in some implementations, provide an interface for several network gateways of the IP network 202, which in turn may provide an interface for several customer gateways.

Internet services are often offered to customers or connected networks of the IP network 202 with a limited transmission speed or range of available transmission speeds. For example, Internet services may be offered to a residential or home network with transmission speeds starting at 100 megabytes per second (Mbps) ranging up to 1 Gigabytes per second (Gbps), at various costs depending on the transmission speed. Often, the offered transmission speed for the Internet access service is based on one or more technical limitations of components of the IP network 202. For example, different types of transmission lines of the network may provide different bandwidths which may limit transmission speeds to connected networks. More particularly, a Digital Subscriber Line (DSL) may include a transmission speed limitation of 100 Mbps, a coaxial cable transmission line may provide up to 10 Gbps, and fiber optic transmission lines may provide up to 200 Gbps. Further, each network device of the IP network 202 may include its own technical limitations on the speed at which data packets may be processed and routed to other network devices, including limitations at each communication port of the respective devices. The number of devices connected to an interface device may also limit the transmission speed of an offered Internet service. For example, a building may include several customers or connected networks, all of which may connect to IP network 202 via the network gateway.

In one or more embodiments, during a VNF OS image installation on any of the customer edge gateways 205, the VNF OSs may be copied into a separate, partitioned storage of the universal customer edge gateway of the network environment 150 so that the VNFs themselves are not deployed/instantiated. When a customer (e.g., user) of the universal customer edge gateway devices requests to deploy/instantiate a VNF from a supported list of the pre-cached VNFs 212 stored on the universal customer edge gateway devices, the OS of a selected VNF 212 may be copied internally from the cache partition to a hypervisor. In this manner, the OSs of the VNFs 212 may not be installed on the universal customer edge gateway devices, but rather the VNFs 212 may be stored as software on the universal customer edge gateway devices to instantiate software of one or more supported VMFs 212 (e.g., from among multiple VMFs supported by a customer edge gateway device).

In one or more embodiments, a user may define the local cloud at which VNF 212 OS images may be pre-stored. The name, point of presence, release, and cached VNF 212 images directory (e.g., list) location may be generated, along with a user login for authentication.

In one or more embodiments, the cached VNFs 212 may be copied in a universal customer gateway edge device. The VNF 212 cache partition may be protected with a root privilege. It may not be necessary to delete the cached VNF 212 images.

The download link of the copies of VNF 212 OSs available for instantiation may be a .img extension, and the list of VNF 212 copies may include .qcow2 files.

Figure 3:
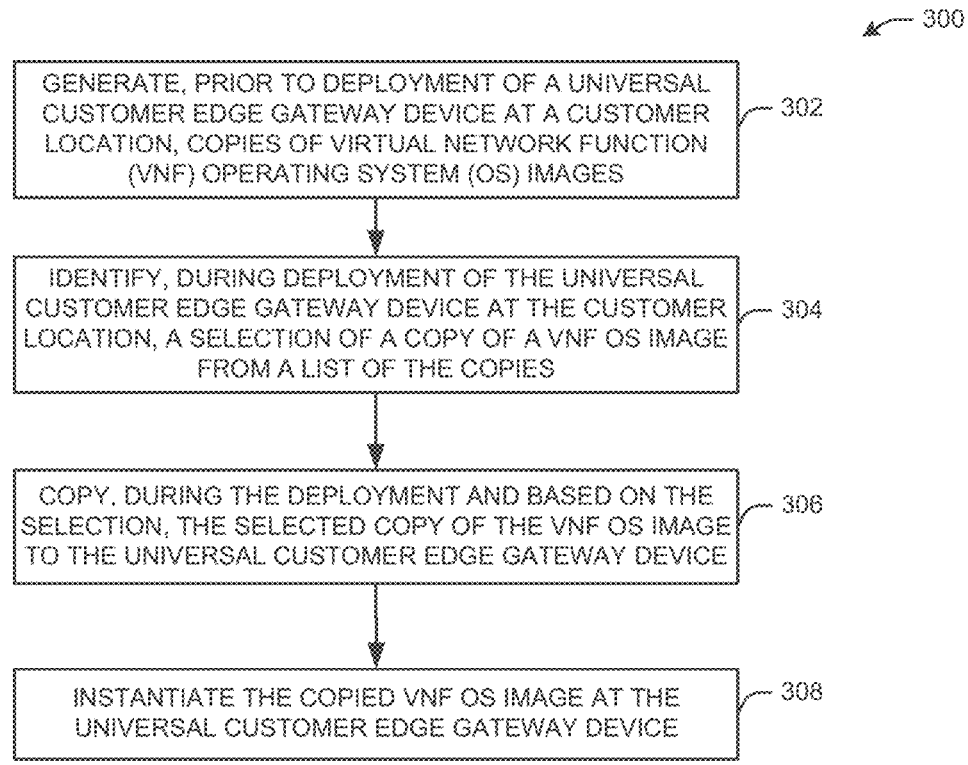
FIG. 3 is a flowchart illustrating a process for staging universal customer edge gateway devices in accordance with one embodiment.

FIG. 3 is a flowchart illustrating a process 300 for staging universal customer edge gateway devices in accordance with one embodiment.

At block 302, a device (or system, e.g., the customer edge gateway device of FIGS. 1 and 2) may generate, prior to deployment of the device at a customer location, copies of VNF OS images (e.g., for any of the VNFs 212 of FIG. 2). The OS of any VNF may be copied into the local storage of the universal customer edge gateway device. The storage of the VNF OSs may use a separate and secure partition in the universal customer edge gateway device, and the VNFs themselves may not be deployed/instantiated.

At block 304, the device may identify, during a deployment of the device at a customer location, a selection of a copy of a VNF OS image from a list of the copies. An API call to get the list may require authentication of a user.

At block 306, the device may copy, during the deployment and based on the user selection, the selected copy of the VNF OS image to the device. When a customer requests to deploy/instantiate a VNF from a supported list, the OS of the VNF may be copied internally from a cache partition to a hypervisor rather than downloading from backend systems over the internet.

At block 308, the device may instantiate the copied VNF OS image at the device. In this manner, the VNF may not be instantiated, but because the image is pre-cached, the OS of the VNF may be instantiated without being downloaded (e.g., over the Internet).

It is understood that the above descriptions are for purposes of illustration and are not meant to be limiting.

Figure 4:
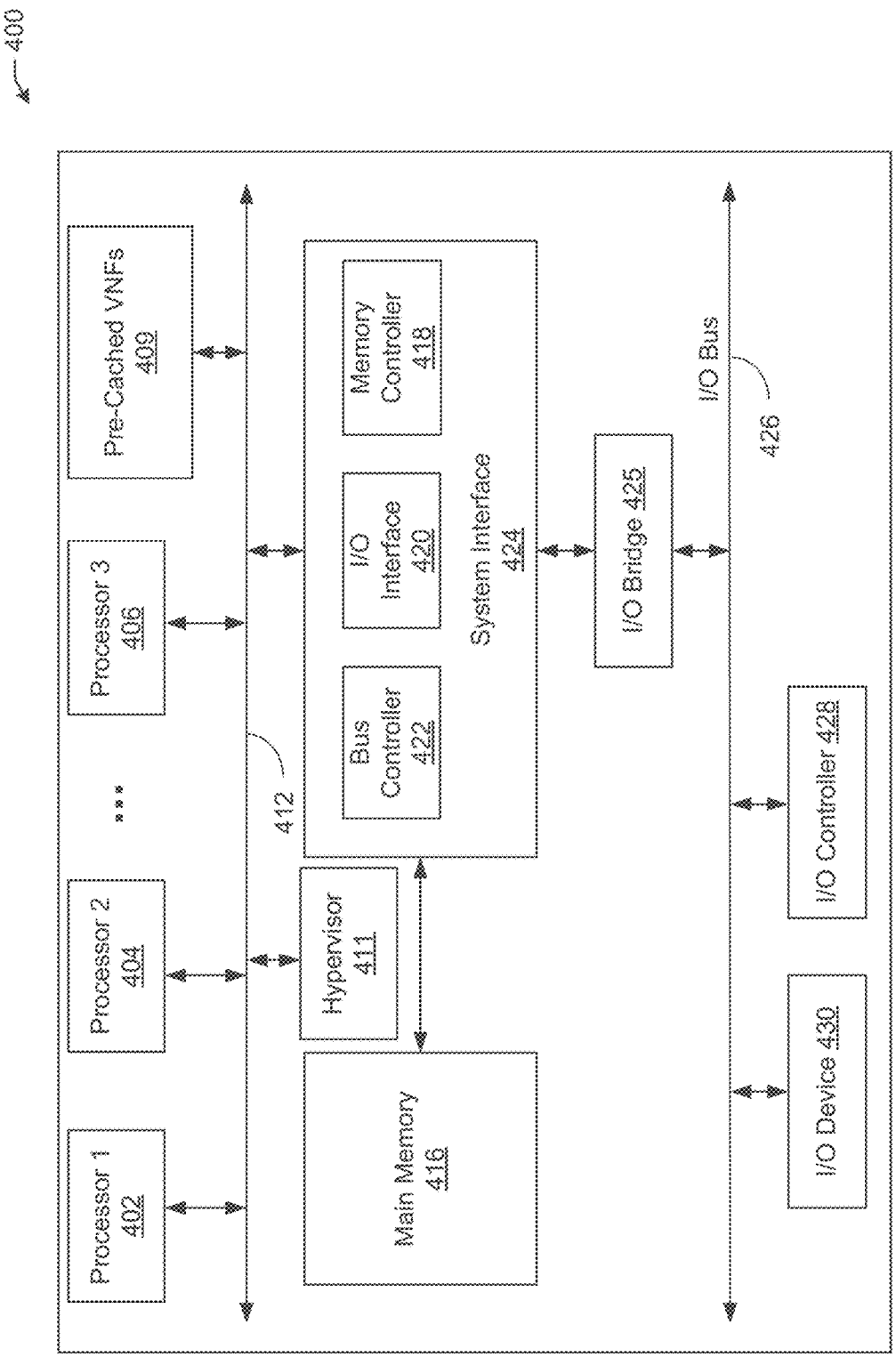
FIG. 4 is a diagram illustrating an example of a computing system that may be used in implementing embodiments of the present disclosure.

FIG. 4 is a block diagram illustrating an example of a computing device or computer system 400 which may be used in implementing the embodiments of the components of the network disclosed above. For example, the computing system 400 of FIG. 4 may represent at least a portion of the network environment 100 shown in FIG. 1 and/or the network operating environment 200 of FIG. 2, and discussed above. The computer system (system) includes one or more processors 402-406, one or more pre-cached VNFs 409 (e.g., separately and security stored and partitioned), and a hypervisor 411 (e.g., to instantiate and run virtual machines, such as a copied VNF from the one or more pre-cached VNFs 409). Processors 402-406 may include one or more internal levels of cache (not shown) and a bus controller 422 or bus interface unit to direct interaction with the processor bus 412. Processor bus 412, also known as the host bus or the front side bus, may be used to couple the processors 402-406 with the system interface 424. System interface 424 may be connected to the processor bus 512 to interface other components of the system 400 with the processor bus 412. For example, system interface 424 may include a memory controller 418 for interfacing a main memory 416 with the processor bus 412. The main memory 416 typically includes one or more memory cards and a control circuit (not shown). System interface 424 may also include an input/output (I/O) interface 420 to interface one or more I/O bridges 425 or I/O devices with the processor bus 412. One or more I/O controllers and/or I/O devices may be connected with the I/O bus 426, such as I/O controller 428 and I/O device 430, as illustrated.

I/O device 430 may also include an input device (not shown), such as an alphanumeric input device, including alphanumeric and other keys for communicating information and/or command selections to the processors 402-406. Another type of user input device includes cursor control, such as a mouse, a trackball, or cursor direction keys for communicating direction information and command selections to the processors 402-406 and for controlling cursor movement on the display device.

System 400 may include a dynamic storage device, referred to as main memory 416, or a random access memory (RAM) or other computer-readable devices coupled to the processor bus 412 for storing information and instructions to be executed by the processors 402-406. Main memory 416 also may be used for storing temporary variables or other intermediate information during execution of instructions by the processors 402-406. System 400 may include a read only memory (ROM) and/or other static storage device coupled to the processor bus 412 for storing static information and instructions for the processors 402-406. The system outlined in FIG. 4 is but one possible example of a computer system that may employ or be configured in accordance with aspects of the present disclosure.

According to one embodiment, the above techniques may be performed by computer system 400 in response to processor 404 executing one or more sequences of one or more instructions contained in main memory 416. These instructions may be read into main memory 416 from another machine-readable medium, such as a storage device. Execution of the sequences of instructions contained in main memory 416 may cause processors 402-406 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 406 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 416, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

What is claimed:

1. A method for staging a universal customer edge gateway device, the method comprising:
   generating, prior to shipment of the universal customer edge gateway device to a customer location, copies of virtual network function (VNF) operating system (OS) images on the universal customer edge gateway device, the copies comprising a first copy of a first VNF OS image and a second copy of a second VNF OS image;
   identifying, by at least one processor, during a deployment of the universal customer edge gateway device at the customer location, a selection of the first copy from a list of the copies;
   copying, by the at least one processor, during the deployment and based on the selection, the first VNF OS image to the universal customer edge gateway device; and
   instantiating, by the at least one processor, at the universal customer edge gateway device, the copied first VNF OS image, wherein the copied first VNF OS image is instantiated without instantiating a first VNF associated with the first VNF OS.

2. The method of claim 1, wherein the copying and the instantiating are performed without downloading the first VNF OS using the Internet.

3. The method of claim 1, further comprising:
   requesting, using an application programming interface (API) get call, the list.

4. The method of claim 3, wherein the API get call comprises an authorization token.

5. A system for staging a universal customer edge gateway device, the system comprising:
   at least one processor of the universal customer edge gateway device coupled to memory of the universal customer edge gateway device; and
   copies of virtual network function (VNF) operating system (OS) images on the universal customer edge gateway device, the copies comprising a first copy of a first VNF OS image and a second copy of a second VNF OS image, wherein the staging comprising:
   generate, prior to shipment of the universal customer edge gateway device to a customer location, the copies;

identify, during a deployment of the universal customer edge gateway device at the customer location, a selection of the first copy from a list of the copies;

copy, during the deployment and based on the selection, the first VNF OS image to the universal customer edge gateway device; and instantiate, at the universal customer edge gateway device, the copied first VNF OS image, wherein the copied first VNF OS image is instantiated without instantiating a first VNF associated with the first VNF OS.

6. The system of claim 5, wherein the copying and the instantiating are performed without downloading the first VNF OS using the Internet.

7. The system of claim 5, wherein the at least one processor is further configured to:

request, using an application programming interface (API) get call, the list, wherein the API get call comprises an authorization token.

8. A device for staging a universal customer edge gateway device, the device comprising at least one processor coupled to memory, the staging comprising:

generate, prior to shipment of the universal customer edge gateway device to a customer location, copies of virtual network function (VNF) operating system (OS) images on the universal customer edge gateway device, the copies comprising a first copy of a first VNF OS image and a second copy of a second VNF OS image;

identify, during a deployment of the universal customer edge gateway device at the customer location, a selection of the first copy from a list of the copies;

copy, during the deployment and based on the selection, the first VNF OS image to the universal customer edge gateway device; and instantiate, at the universal customer edge gateway device, the copied first VNF OS image, wherein the copied first VNF OS image is instantiated without instantiating a first VNF associated with the first VNF OS.

9. The device of claim 8, wherein the copying and the instantiating are performed without downloading the first VNF OS using the Internet.

10. The device of claim 8, wherein the at least one processor is further configured to:

request, using an application programming interface (API) get call, the list, wherein the API get call comprises an authorization token.

* * * * *